(12) United States Patent
Hayaki et al.

(10) Patent No.: US 12,293,172 B2
(45) Date of Patent: May 6, 2025

(54) TAMPER DETECTION FEATURE EMBEDDING DEVICE, TAMPER DETECTION FEATURE EMBEDDING METHOD, AND COMPUTER READABLE MEDIUM

(71) Applicant: NEC Corporation, Tokyo (JP)

(72) Inventors: Yuto Hayaki, Tokyo (JP); Norio Yamagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 202 days.

(21) Appl. No.: 18/032,050

(22) PCT Filed: Oct. 28, 2020

(86) PCT No.: PCT/JP2020/040338
§ 371 (c)(1),
(2) Date: Apr. 14, 2023

(87) PCT Pub. No.: WO2022/091231
PCT Pub. Date: May 5, 2022

(65) Prior Publication Data
US 2023/0393822 A1    Dec. 7, 2023

(51) Int. Cl.
*G06F 8/41*        (2018.01)
*G06F 21/54*       (2013.01)

(52) U.S. Cl.
CPC .............. *G06F 8/433* (2013.01); *G06F 21/54* (2013.01); *G06F 2221/033* (2013.01)

(58) Field of Classification Search
CPC ..... G06F 8/433; G06F 21/54; G06F 2221/033
(Continued)

(56) References Cited

U.S. PATENT DOCUMENTS 11,003,464 B2 *   5/2021   Black ...................... G06F 8/433
11,403,388 B2 *   8/2022   Kanei ..................... G06F 21/12
(Continued)

FOREIGN PATENT DOCUMENTS

| JP | 2008-084275 A | 4/2008 |
|----|---------------|--------|
| WO | 2011/033773 A1 | 3/2011 |
| WO | 2018/150619 A1 | 8/2018 |

OTHER PUBLICATIONS

Chaudhari et al., "Stream Cipher Hash based Execution Monitoring (SCHEM) Framework for Intrusion Detection on Embedded Processors", 2012, IEEE, pp. 162-167. (Year: 2012).*
(Continued)

*Primary Examiner* — Ted T. Vo
(74) *Attorney, Agent, or Firm* — Sughrue Mion, PLLC

(57) ABSTRACT

A device inputs a first source code, which is source code of the software to be monitored; builds the first source code to generate a first binary; generates a first CFG based on the first binary; embeds a tamper detection feature and tamper detection feature calling functions in a first source code based on the first CFG to generate a second source code, builds a second source code to generate a second binary; generates a second CFG based on the second binary; creates an allowed list based on the second binary and the second CFG, and outputs the second binary and the allowed list. Here, in creating the allowed list, the monitoring range for the tamper detection feature calling functions is determined based on the second CFG, and a list of hash values of the monitoring range for the tamper detection feature calling functions is created as an allowed list.

7 Claims, 10 Drawing Sheets

(58) Field of Classification Search
USPC .................................................. 717/130–133
See application file for complete search history.

(56) References Cited

U.S. PATENT DOCUMENTS

| | | | | |
|---|---|---|---|---|
| 2008/0184041 A1* | 7/2008 | Jakubowski | ............ | G06F 21/14 |
| | | | | 726/22 |
| 2020/0042695 A1* | 2/2020 | Kanei | ..................... | G06F 21/64 |
| 2023/0401339 A1* | 12/2023 | Hayaki | ................... | G06F 21/12 |

OTHER PUBLICATIONS

Biondo et al., "Back To The Epilogue: Evading Control Flow Guard via Unaligned Targets", 2018, Network and Distributed Systems Security, 15 pages. (Year: 2018).*
International Search Report for PCT Application No. PCT/JP2020/040338, mailed on Jan. 19, 2021.
Toshiki Kobayashi, Takayuki Sasaki, Astha Jada, Daniele E. Asoni, Adrian Perrig, "SAFES; Sand-boxed Architecture for Frequent Environment Self-measurement", Proceedings of the 3rd Workshop on System Software for Trusted Execution, 2018, pp. 37-41.
Yuto Hayaki, Takayuki Sasaki, Seng Pel Liew, Koki Tomita, Norio Yamagaki, "Proposal of proof of trust by tampering detection system for IoT devices", SCIS2020, 2020, pp. 1-6.
NEC Digital Platform Operations, "Lightweight program tampering detection development kit for detecting unlawful manipulation of IoT devices", C&C User Forum & EXPO, Oct. 2019.

* cited by examiner

TAMPER DETECTION FEATURE EMBEDDING DEVICE, TAMPER DETECTION FEATURE EMBEDDING METHOD, AND COMPUTER READABLE MEDIUM

This application is a National Stage Entry of PCT/JP2020/040338 filed on Oct. 28, 2020, the contents of all of which are incorporated herein by reference, in their entirety.

TECHNICAL FIELD

The present disclosure relates to a tamper detection feature embedding device, a tamper detection feature embedding method, and a computer readable medium, and in particular, to a tamper detection feature embedding device for use in software for devices such as Internet of Things (IoT) devices, a tamper detection feature embedding method, and a computer readable medium.

BACKGROUND ART

With the recent proliferation of IoT devices, there is a demand for security systems that can operate even in devices that do not have ample resources such as memory and CPU (Central Processing Unit), such as IoT devices.

As a related security system, a method is known in which an allowed list type tamper detection feature using hash values is embedded in a device to monitor whether the software on the device is in a correct state (whether it has been tampered with or not).

An allowed list type tamper detection feature using hash values is a feature of monitoring for tampering by registering information in a memory of a device in normal operation in advance in an allowed list, and comparing the information in the memory of the device in operation with the information in the memory registered in the allowed list. At this time, the information in the memory is managed in the form of hash values.

The allowed list type tamper detection feature using hash values is realized as follows. First, information in the memory of a device in normal operation is acquired in advance by some method, and the acquired information in the memory is registered in the allowed list. The information in the memory will be information on how the executable code is expanded on the memory. Next, the information in the memory is acquired at any timing during the operation of the device, and the acquired information in the memory is compared with the information in the memory registered in the allowed list. As a result of the comparison, if the information in the memory acquired during the operation of the device and the information in the memory registered in the allowed list match, there is no tampering (no attack), while if they do not match, the device has been tampered with (attacked).

The meaning of the allowed list is that it is a snapshot of a memory in normal operation. However, registering and comparing snapshots of memory in the form of hash values has less impact on the original operation of the device than registering and comparing snapshots of memory in their original form. Therefore, information in the memory in normal operation is registered in the allowed list in the form of hash values, and information in the memory in operation is also managed in the form of hash values. Examples of the allowed list type tamper detection feature using hash values are disclosed in Non Patent Literatures 1 and 2.

Non Patent Literature 1 discloses a method for detecting tampering with the feature to be executed next, triggered by an input to the device. According to the method in Non Patent Literature 1, the user input determines the feature to be executed next (herein referred to as a feature A). In addition, functions calling the tamper detection feature (hereinafter referred to as the tamper detection feature calling functions) are invoked by user input. The tamper detection feature calling functions call the tamper detection feature that monitors for tampering, limited to the memory area used when executing the feature A.

Non Patent Literature 2 discloses a method aiming at faster monitoring than the method in Non Patent Literature 1 by setting the monitoring range in one time as one node of a control flow graph (CFG). Here, the CFG is a graph indicating in which order the program is executed. Thus, the CFG is a directed graph. The nodes of the CFG become the executable code of successive programs. Executable code can be described either at the binary level or at the source code level, but here those described at the binary level are treated. In this case, one node of the CFG is separated by each branch instruction. A block in which the program is separated by branch instructions is referred to as a basic block. That is, one node of the CFG is one basic block. Non Patent Literature 2 discloses a method for embedding triggers (equivalent to the tamper detection feature calling functions described above) in a source code to monitor the executable codes of nodes based on the CFG.

Patent Literature 1 discloses a method for embedding a tamper detection feature directly in a byte code. According to the method for Patent Literature 1, a CFG is created for each function for the program in which the tamper detection feature is to be embedded. Then, nodes are randomly extracted for each function based on the CFG, and the tamper detection feature is embedded in the extracted nodes and the nodes that are always executed before that.

Patent Literature 2 discloses a method for controlling the frequency with which the checker code (equivalent to the tamper detection feature described above) executes a tamper detection process. According to the method for Patent Literature 2, the checker code has an active state and an inactive state, and the tamper detection process is executed only when the checker code embedded in the program is in the active state.

CITATION LIST

Patent Literature

Patent Literature 1: International Patent Publication No. WO2018/150619
Patent Literature 2: Japanese Unexamined Patent Application Publication No. 2008-084275

Non Patent Literature

Non Patent Literature 1: Toshiki Kobayashi, Takayuki Sasaki, Astha Jada, Daniele E. Asoni, Adrian Perrig, "SAFES: Sand-boxed Architecture for Frequent Environment Self-measurement", Proceedings of the 3rd Workshop on System Software for Trusted Execution, 2018, pp. 37-41
Non Patent Literature 2: Yuto Hayaki, Takayuki Sasaki, Sempei Liu, Mitsuteru Tomita, and Norio Yamagaki, "Proposal of Proof of Trust Technology with tamper detection Feature for IoT Devices," SCIS2020, 2020, pp. 1-6

SUMMARY OF INVENTION

Technical Problem

In the above tamper detection feature used for devices such as IoT devices, it is necessary to reduce the impact on the operation of the devices by reducing the impact on the original operation of the devices. One possible method to reduce the impact on the original operation of the devices is to narrow the monitoring range at a time, as in the methods of Non Patent Literatures 1 and 2. At that time, the portion of the program to be executed immediately afterwards must be monitored without omission. Another perspective is that software for devices such as IoT devices is periodically updated. Therefore, in consideration of practical aspects, it is necessary for software developers to easily embed a tamper detection feature.

In the method for Non Patent Literature 1, user input is used as the trigger, so for a device with specifications that require little input from the user, the monitoring range at one time by the tamper detection feature calling functions may become large, and this may result in an impact on the operation of the device. In addition, in the method for Non Patent Literature 1, the operation of the tamper detection feature may affect the original operation of the device, even in cases where a function with a large number of instructions exists in one feature. Furthermore, Non Patent Literature 1 does not clearly state how to embed a tamper detection feature.

In the method for Patent Literature 1, a tamper detection feature is randomly embedded in the nodes on the CFG, which may result in a wide interval between the nodes to be embedded. In addition, the method for Patent Literature 1 does not specify with respect to the method for detecting tampering. In consideration of these, in the method for Patent Literature 1, the monitoring range in one time by the tamper detection feature calling functions becomes wide, and the monitoring time to monitor for tampering may affect the operation of the equipment.

In the method for Patent Literature 2, the tamper detection process is not executed when the checker code is inactive, thereby reducing the processing load. In this case, if the checker code that monitors the relevant range is inactive immediately after tampering occurs, the program may be executed without detecting the tampering. In addition, even if there is an inactive checker code, if tampering is to be detected without omission, the monitoring range in one time by the tamper detection feature calling functions is likely to become wider, and in such cases, the time of monitoring in one time may also become longer.

On the other hand, in the method for Non Patent Literature 2, since the tamper detection feature is executed in units of basic blocks of the program, unlike the method for Non Patent Literature 1, the existence of tampering can be monitored without depending on user input or the like. In addition, when comparing basic blocks and functions, basic blocks generally have fewer instructions than functions. Therefore, the method for Non Patent Literature 2 can avoid the increase in the monitoring range in one time by the tamper detection feature calling functions, and may reduce the impact on the original operation of the device. Non Patent Literature 2 also specifies how to embed a tamper detection feature in the source code.

However, in the method for Non Patent Literature 2, under certain conditions, there are basic blocks that are not monitored, which may lead to monitoring omissions. The condition for the existence of a basic block that is not monitored is the presence of a syntax such as a conditional branch or loop statement in the source code. If these syntaxes exist in the source code, there may be places in the source code where the tamper detection feature calling functions cannot be inserted, which makes it impossible to embed tamper detection feature calling functions to correspond to all the basic blocks. Such an example will be described with reference to FIG. 1.

FIG. 1 illustrates an example of a source code and a CFG containing basic blocks that are not monitored by the method for Non Patent Literature 2. The right side of FIG. 1 illustrates the source code, and the left side of FIG. 1 illustrates the CFG generated based on the binary built from the source code on the right. The numbers in each node on the left side of FIG. 1 indicate the line number of the source code on the right side, indicating that each node contains the executable code corresponding to the line number indicated by the number in each node. For example, node 2 contains an executable code corresponding to the lines 6 and 7 of the source code. In the example in FIG. 1, it is assumed that the trigger to monitor the node 2 can be inserted between lines 5 and 6. However, because the node 3 contains executable code corresponding to the line 8, a trigger cannot be inserted in the source code to monitor the line 8, and it is not monitored.

As described above, the methods of Non Patent Literatures 1 and Patent Literatures 1 and 2 have the problem that the monitoring range by the tamper detection feature calling functions may become wide. On the other hand, the method for Non Patent Literature 2 has the possibility of avoiding the increase in the monitoring range by the tamper detection feature calling functions, but it has the problem that there are nodes (basic blocks) that are not monitored, which may result in monitoring omissions.

Therefore, in view of the above-described problems, an object of the present disclosure is to provide a tamper detection feature embedding device, a tamper detection feature embedding method, and a computer readable medium that can solve any of the above-described problems.

Solution to Problem

A tamper detection feature embedding device according to an aspect of the present disclosure is
- a tamper detection feature embedding device configured to embed an allowed list type tamper detection feature using hash values in a software to be monitored, the tamper detection feature embedding device including:
- an input/output unit configured to receive input of a first source code, which is the source code of the software;
- a build unit configured to build the first source code to generate a first binary;
- a CFG generation unit configured to generate a first control flow graph (CFG) based on the first binary;
- a tamper detection feature embedding unit configured to determine embedding points to embed tamper detection feature calling functions in the first source code based on the first CFG, embed the tamper detection feature calling functions in the determined embedding points in the first source code, and embed the tamper detection feature in the first source code;
- the build unit configured to build a second source code, which is the source code in which the tamper detection feature and the tamper detection feature calling functions are embedded in the first source code, to generate a second binary;

the CFG generation unit configured to generate a second CFG based on the second binary;

an allowed list creation unit configured to create an allowed list based on the second binary and the second CFG, and the input/output unit configured to output the second binary and the allowed list, in which the allowed list creation unit determines a monitoring range for the tamper detection feature calling functions based on the second CFG, and creates a list of hash values of the monitoring range for the tamper detection feature calling functions as the allowed list.

A tamper detection feature embedding method according to another aspect of the present disclosure is a tamper detection embedding method executed by a tamper detection feature embedding device configured to embed an allowed list type tamper detection feature using hash values in a software to be monitored, the tamper detection feature embedding method including:

an input step of inputting a first source code, which is the source code of the software;

a first build step of building the first source code to generate a first binary;

a first CFG generation step of generating a first control flow graph (CFG) based on the first binary;

a tamper detection feature embedding step of determining embedding points to embed tamper detection feature calling functions in the first source code based on the first CFG, embedding the tamper detection feature calling functions in the determined embedding points in the first source code, and embedding the tamper detection feature in the first source code;

a second build step of building a second source code, which is the source code in which the tamper detection feature and the tamper detection feature calling functions are embedded in the first source code, to generate a second binary;

a second CFG generation step of generating a second CFG based on the second binary;

an allowed list creation step of creating an allowed list based on the second binary and the second CFG, and an output step of outputting the second binary and the allowed list, in which the allowed list creation step determines the monitoring range for the tamper detection feature calling function based on the second CFG, and creates a list of hash values of the monitoring range for the tamper detection feature calling function as the allowed list.

A computer readable medium according to yet another aspect of the present disclosure is a non-transitory computer readable medium storing a program that causes a computer to execute processing of embedding an allowed list type tamper detection feature using hash values in a software to be monitored, the program including:

an input step of inputting a first source code, which is the source code of the software;

a first build step of building the first source code to generate a first binary;

a first CFG generation step of generating a first control flow graph (CFG) based on the first binary;

a step of tamper detection feature embedding step of determining embedding points to embed tamper detection feature calling functions in the first source code based on the first CFG, embedding the tamper detection feature calling functions in the determined embedding point in the first source code, and embedding the tamper detection feature in the first source code;

a second build step of building a second source code, which is the source code in which the tamper detection feature and the tamper detection feature calling functions are embedded in the first source code, to generate a second binary;

a second CFG generation step of generating a second CFG based on the second binary;

an allowed list creation step of creating an allowed list based on the second binary and the second CFG, and an output step of outputting the second binary and the allowed list, in which the allowed list creation step determines the monitoring range for the tamper detection feature calling function based on the second CFG, and creates a list of hash values of the monitoring range for the tamper detection feature calling function as the allowed list.

Advantageous Effects of Invention

The above-described aspect has the effect of reducing the number of nodes on the CFG that cannot be monitored in the software to be monitored.

EXAMPLE EMBODIMENT

Figure 1:
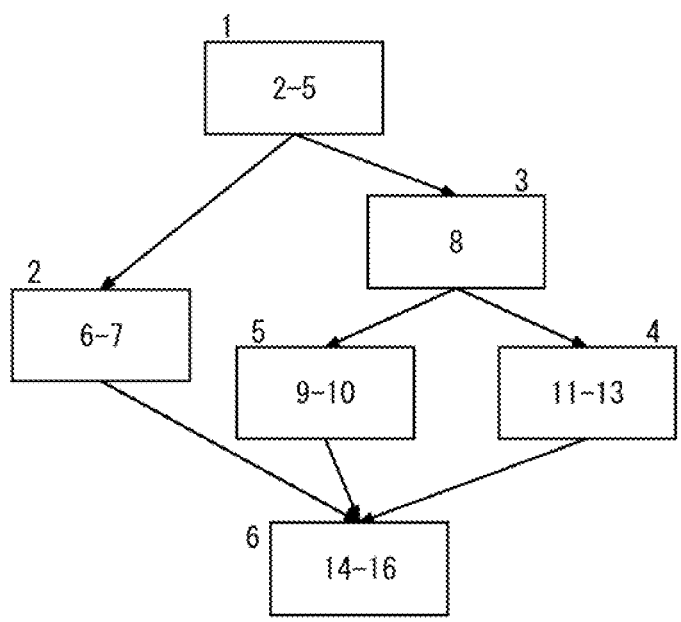
FIG. 1 illustrates an example of a source code and a CFG.

Example embodiments of the present disclosure are described below with reference to the drawings. In the following example embodiments, identical or equivalent elements are denoted by the same reference numerals, and redundant descriptions will be omitted. The tamper detection feature embedding device described in each of the following example embodiments are examples of devices that embed an allowed list type tamper detection feature using hash values for the software to be monitored.

First Example Embodiment

Configuration of Example Embodiment 1

Figure 2:
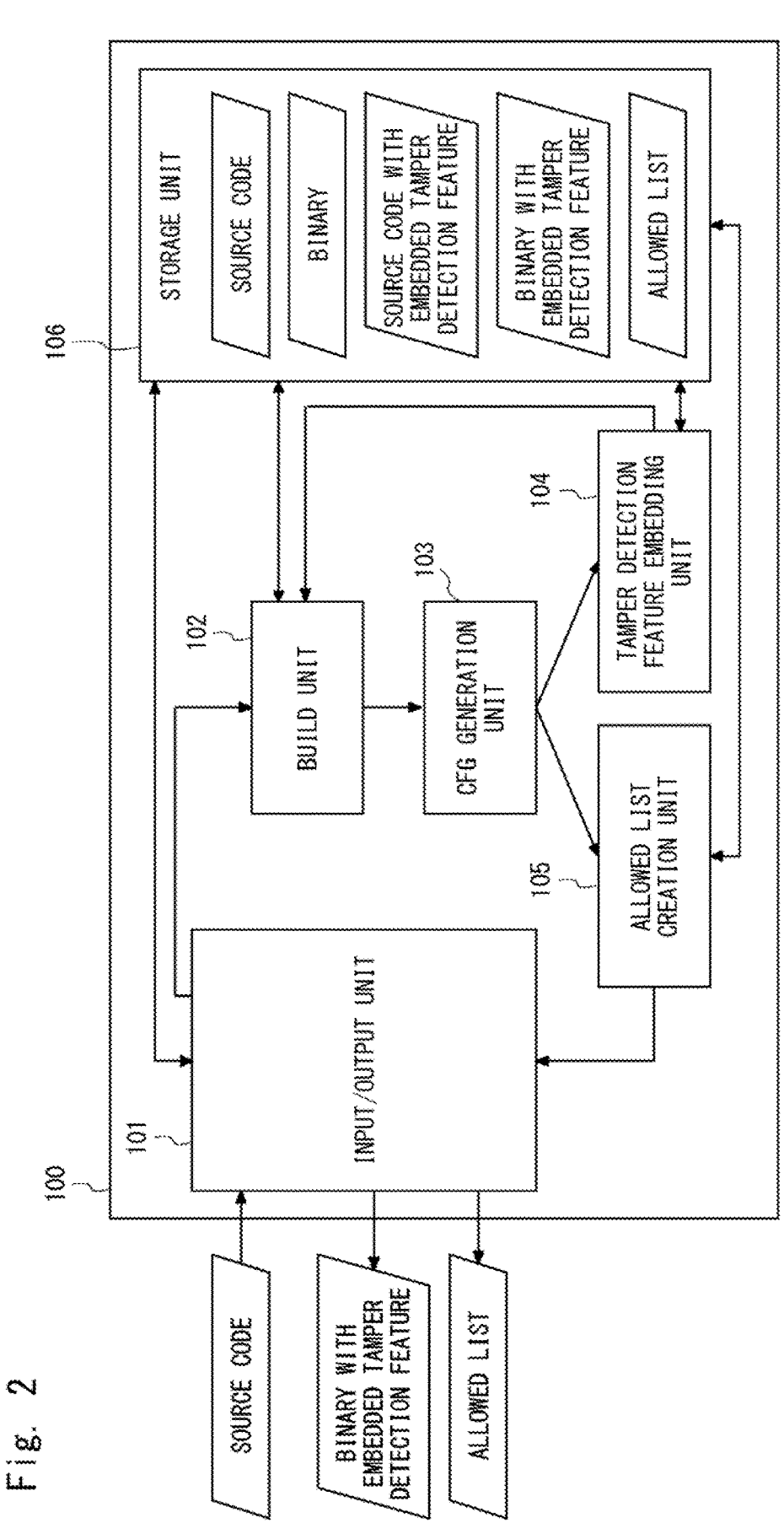
FIG. 2 is a block diagram illustrating an example of the configuration of a tamper detection feature embedding device according to the first example embodiment.

First, an example configuration of a tamper detection feature embedding device 100 according to the first example embodiment is described with reference to FIG. 2. In FIG. 2, unidirectional arrows indicate the direction of flow of certain data (or signals, information, and the like) in a straightforward manner and do not exclude bidirectionality (the same applies to FIGS. 6 and 8 described later).

Referring to FIG. 2, the tamper detection feature embedding device 100 according to the first example embodiment includes an input/output unit 101, a build unit 102, a control flow graph (CFG) generation unit 103, a tamper detection feature embedding unit 104, an allowed list creation unit 105, and a storage unit 106.

Each of these components operates as follows

The input/output unit 101 receives input of a source code (first source code) of the software to be monitored, that is, the software in which the tamper detection feature is to be embedded. The software to be monitored is, for example, control software on IoT devices. The input/output unit 101 stores the input source code in the storage unit 106 and sends a notification to the build unit 102 to execute processing.

When the input/output unit 101 receives the notification described later from the allowed list creation unit 105, it reads from the storage unit 106 the binary of the software in which the tamper detection feature and the tamper detection feature calling functions described later are embedded (second binary, hereinafter referred to as binary with embedded tamper detection feature), and outputs the read binary with embedded tamper detection feature. The input/output unit 101 also reads an allowed list in file format described later from the storage unit 106 and outputs the read allowed list together with the binary with embedded tamper detection feature. However, the input/output unit 101 is not limited to reading the binary with embedded tamper detection feature and the allowed list from the storage unit 106. The input/output unit 101 may receive the binary with embedded tamper detection feature from the build unit 102, and the allowed list from the allowed list creation unit 105.

When the build unit 102 receives the notification from the input/output unit 101, it reads the source code from the storage unit 106 and builds it. The build unit 102 stores the binary generated by the build (the first binary) in the storage unit 106 and sends a notification to the CFG generation unit 103 to execute processing.

When the build unit 102 receives the notification described later from the tamper detection feature embedding unit 104, it reads from the storage unit 106 the source code in which the tamper detection feature and the tamper detection feature calling functions described later are embedded (second source code, hereinafter referred to as source code with embedded tamper detection feature), and builds it. The build unit 102 stores the binary with embedded tamper detection feature generated by the build in the storage unit 106 and sends a notification to the CFG generation unit 103 to execute processing.

When the build unit 102 sends a notification to the CFG generation unit 103, it specifies the binary to be processed by the CFG generation unit 103. The build unit 102 can determine whether the tamper detection feature is embedded or not in the binary generated by the build, depending on whether it receives the notification from the input/output unit 101 or the tamper detection feature embedding unit 104. Therefore, the build unit 102 also notifies the CFG generation unit 103 whether or not the tamper detection feature is embedded in the binary to be processed by the CFG generation unit 103.

When the CFG generation unit 103 receives a notification from the build unit 102, it reads the binary specified in the notification from the storage unit 106, analyzes the read binary, and generates a CFG. When no tamper detection feature is embedded in the binary, the CFG generation unit 103 sends the CFG (first CFG) generated from the binary to the tamper detection feature embedding unit 104. When the binary is a binary with embedded tamper detection feature, the CFG (second CFG) generated from the binary is sent to the allowed list creation unit 105.

When the tamper detection feature embedding unit 104 receives the CFG from the CFG generation unit 103, it determines embedding points in the source code in which the tamper detection feature calling functions are embedded based on the CFG, and embeds the tamper detection feature calling functions in the determined embedding points. The tamper detection feature embedding unit 104 also embeds the tamper detection feature in the source code. The set of source codes in which the tamper detection feature calling functions and the tamper detection feature are embedded in this manner is the source code with embedded tamper detection feature. The tamper detection feature embedding unit 104 stores the source code with embedded tamper detection feature in the storage unit 106 and sends a notification to the build unit 102 to execute processing.

When the allowed list creation unit 105 receives the CFG from the CFG generation unit 103, it reads the binary with embedded tamper detection feature from the storage unit 106 based on the CFG. The allowed list creation unit 105 creates an allowed list in file format based on the CFG and the binary with embedded tamper detection feature, and stores the created allowed list in the storage unit 106. The allowed list creation unit 105 also sends a notification to the input/output unit 101 to execute processing.

The storage unit 106 stores the source code received from the input/output unit 101, the source code with embedded tamper detection feature received from the tamper detection feature embedding unit 104, the binary and the binary with embedded tamper detection feature received from the build unit 102, and the allowed list received from the allowed list creation unit 105.

The storage unit 106 is not an essential component of the tamper detection feature embedding device 100, and may be provided outside of the tamper detection feature embedding device 100. That is, the tamper detection feature embedding device 100 may be realized with a minimum configuration consisting of the input/output unit 101, the build unit 102, the CFG generation unit 103, the tamper detection feature embedding unit 104, and the allowed list creation unit 105.

Operation of First Example Embodiment

Figure 3:
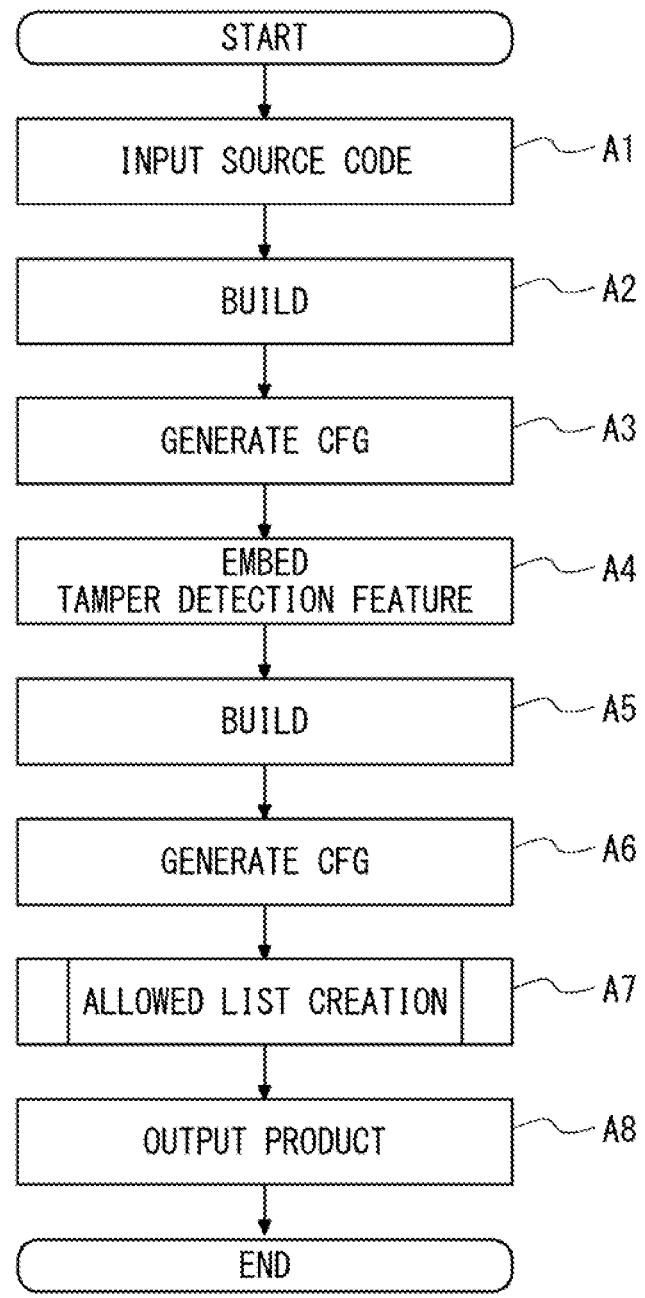
FIG. 3 is a flowchart illustrating an example of the overall operation of the tamper detection feature embedding device according to the first example embodiment.

Next, with reference to the flowchart in FIG. 3, an example of the overall operation of the tamper detection feature embedding device 100 according to the first example embodiment is described.

Referring to FIG. 3, first, the input/output unit 101 receives input of a source code of the software to be monitored, which is all the source code necessary for building. The input/output unit 101 stores the input source code in the storage unit 106 and sends a notification to the build unit 102 to execute processing (step A1).

When the build unit 102 receives the notification from the input/output unit 101, it reads the source code input in step A1 from the storage unit 106, builds the read source code, and generates a binary. The build unit 102 stores the generated binary in the storage unit 106 and sends a notification to the CFG generation unit 103 to execute processing (step A2).

When the CFG generation unit 103 receives a notification from the build unit 102, it reads the binary generated in step A2 from the storage unit 106, analyzes the read binary, and generates a CFG. Furthermore, the CFG generation unit 103 sends the generated CFG to the tamper detection feature embedding unit 104 (step A3).

When the tamper detection feature embedding unit 104 receives the CFG generated in step A3 from the CFG generation unit 103, it determines the embedding points in the source code where the tamper detection feature calling functions are embedded based on the received CFG, and embed the tamper detection feature calling functions in the determined embedding point. Furthermore, the tamper detection feature embedding unit 104 also embeds the tamper detection feature in the source code. As a result, the tamper detection feature embedding unit 104 generates a source code with embedded tamper detection feature in which the tamper detection feature calling functions and the tamper detection feature are embedded. Furthermore, the tamper detection feature embedding unit 104 stores the generated source code with embedded tamper detection feature in the storage unit 106 and sends a notification to the build unit 102 to execute processing (step A4).

When the build unit 102 receives the notification from the tamper detection feature embedding unit 104, it reads the source code with embedded tamper detection feature generated in step A4 from the storage unit 106, builds the read source code with embedded tamper detection feature, and generates a binary with embedded tamper detection feature. The build unit 102 stores the generated binary with embedded tamper detection feature in the storage unit 106 and sends a notification to the CFG generation unit 103 to execute processing (step A5).

When the CFG generation unit 103 receives the notification from the build unit 102, it reads the binary with embedded tamper detection feature generated in step A5 from the storage unit 106, analyzes the read binary with embedded tamper detection feature, and generates a CFG. Furthermore, the CFG generation unit 103 sends the generated CFG to the allowed list creation unit 105 (step A6).

When the allowed list creation unit 105 receives the CFG generated in step A6 from the CFG generation unit 103, it reads the binary with embedded tamper detection feature from the storage unit 106 based on the received CFG. Furthermore, the allowed list creation unit 105 creates an allowed list in file format based on the CFG and the binary with embedded tamper detection feature. Furthermore, the allowed list creation unit 105 stores the allowed list in the storage unit 106 and sends a notification to the input/output unit 101 to execute processing (step A7). The details of step A7 are described later.

When the input/output unit 101 receives the notification from the allowed list creation unit 105, it reads from the storage unit 106 the binary with embedded tamper detection feature generated in step A5 and the allowed list created in step A7, and outputs the read binary with embedded tamper detection feature and the allowed list (step A8).

Figure 4A:
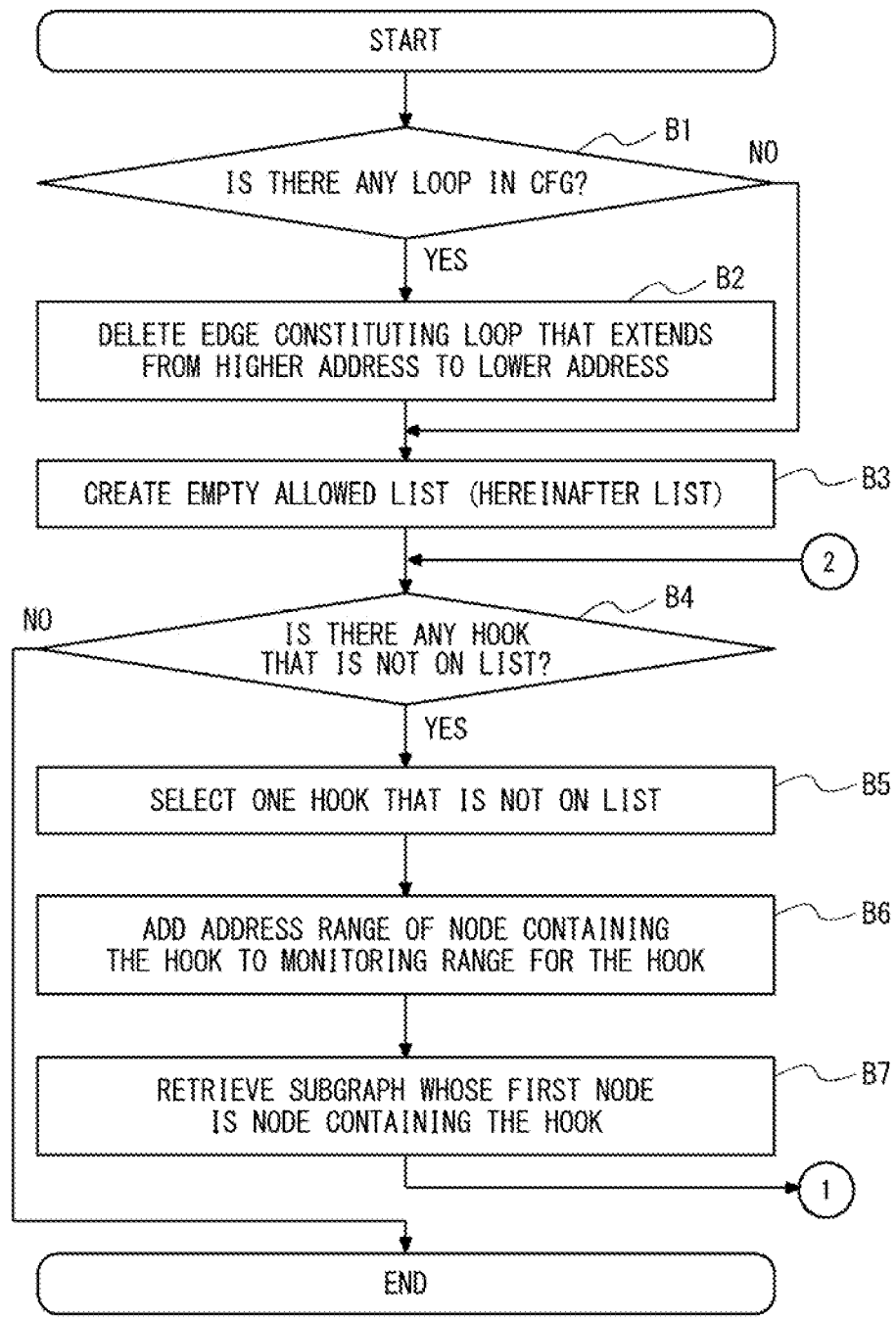
FIG. 4A is a flowchart illustrating an example of the operation executed by the allowed list creation unit according to the first example embodiment in step A7 in FIG. 3.
Figure 4B:
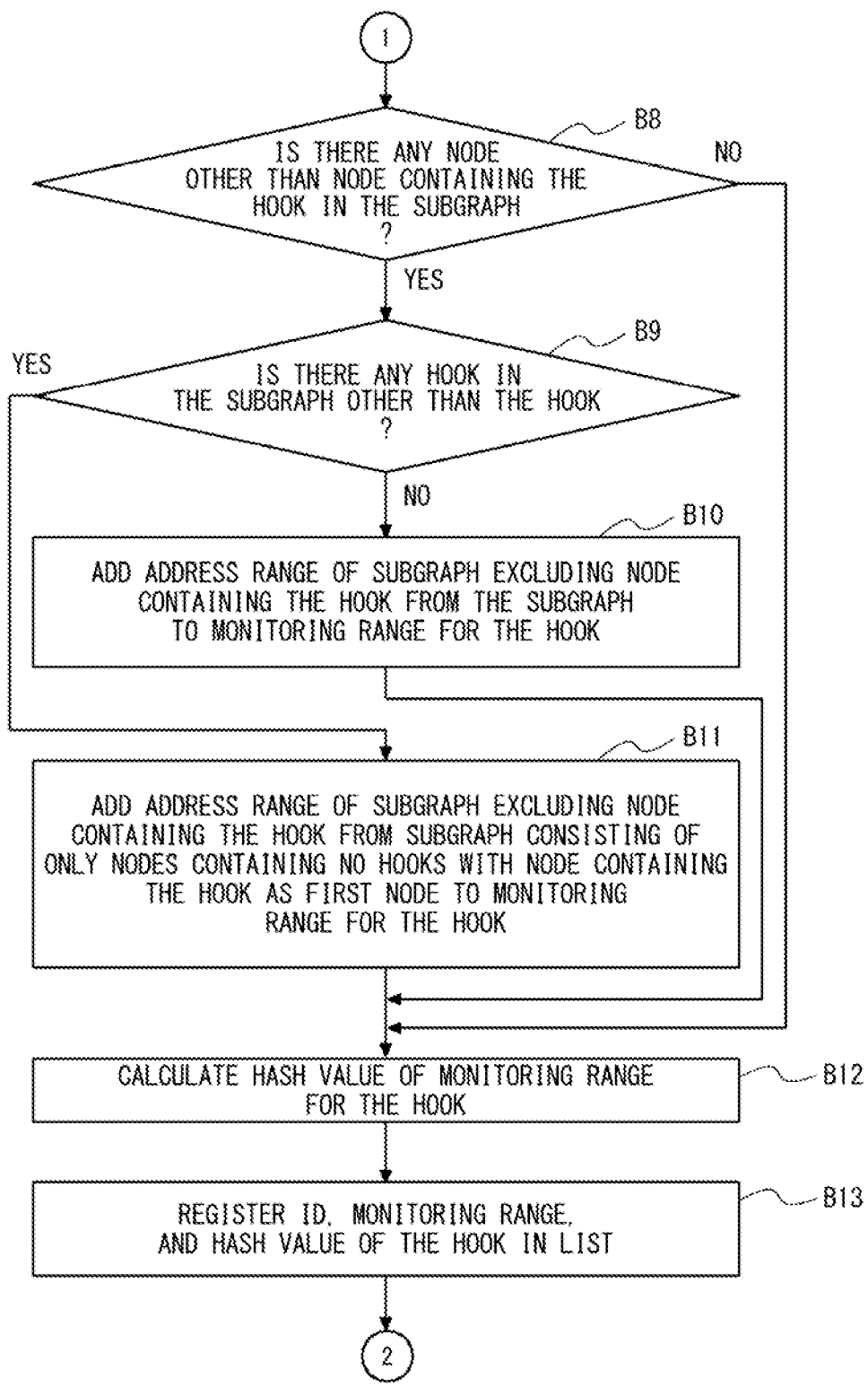
FIG. 4B is a flowchart illustrating an example of the operation executed by the allowed list creation unit according to the first example embodiment in step A7 in FIG. 3.
Figure 5:
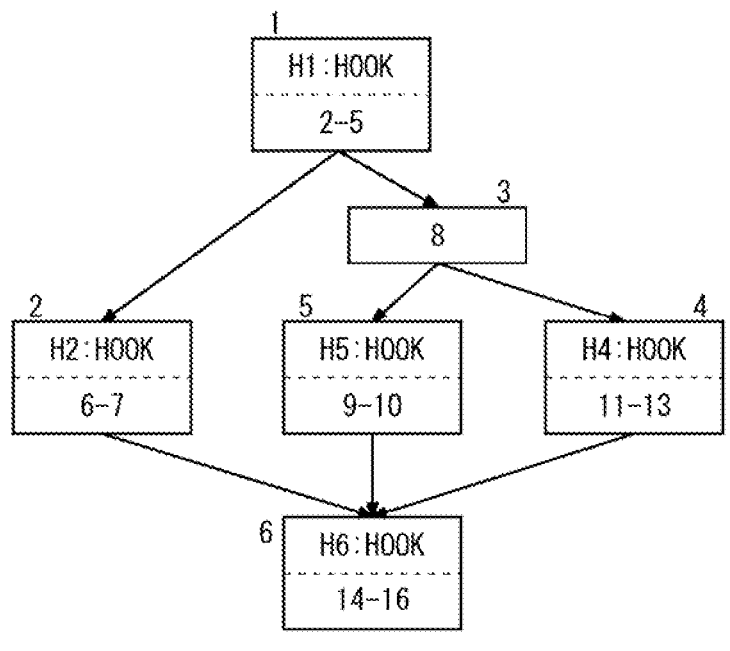
FIG. 5 illustrates an example of a source code and a CFG in which tamper detection feature calling functions are embedded by executing the processing up to step A6 in FIG. 3 for the source code in FIG. 1.

Next, with reference to the flowcharts in FIGS. 4A and 4B, the operation executed by the allowed list creation unit 105 in step A7 in FIG. 3 is described in detail. This section also refers to FIG. 5. FIG. 5 illustrates an example of a source code and a CFG in which tamper detection feature calling functions are embedded by executing the processing up to step A6 in FIG. 3 for the source code in FIG. 1. The relationship between the right side and the left side in FIG. 5 is the same as the relationship between the right side and the left side in FIG. 1.

Referring to FIGS. 4A and 4B, when the allowed list creation unit 105 receives the CFG generated in step A6 from the CFG generation unit 103, it first determines whether or not the received CFG has loops (step B1). Here, when a CFG has loops, it means that loop statements (for example, for or while statement in C language) exist in the program. Conversely, if a CFG has no loops, it means that there are no loop statements in the program. In the processing of step B6 and subsequent steps described later, the CFG needs to have no loops. Therefore, if the CFG has loops (step B1 is YES), the process proceeds to step B2, where the loops are removed from the CFG in step B2. On the other hand, if the CFG has no loops (step B1 is NO), step B2 is skipped and the process proceeds to step B3.

If the CFG has loops in step B1, the allowed list creation unit 105 executes an operation to delete edges extending from the higher address value number to the lower (step B2) for all loops. The CFG contains the executable code and information indicating at which address on the memory the executable code exists. Therefore, the allowed list creation unit 105 can achieve the above operation by using that information.

Next, the allowed list creation unit 105 creates an empty allowed list (referred to as a list from step B4 and subsequent steps in FIGS. 4A and 4B) (step B3). Elements are added to the allowed list by executing the following steps B4 to B13.

First, the allowed list creation unit 105 determines whether or not a tamper detection feature calling function (herein referred to as a hook) that has not been added to the allowed list exists in the CFG generated in step A6 (step B4). If the corresponding hook exists (step B4 is YES), the process proceeds to step B5; if the corresponding hook does not exist (step B4 is NO), the allowed list creation unit 105 sends a notification to the input/output unit 101 and ends the process of step A7.

If the corresponding hook exists in step B4 (step B4 is YES), the allowed list creation unit 105 selects one hook from the corresponding hooks (step B5).

In the subsequent processing of steps B6 to B11, the monitoring range to be monitored by the hook selected in step B5 is determined. Here, a case where the allowed list creation unit 105 selects the hook H1 in FIG. 5 as the hook will be described as an example.

Next, the allowed list creation unit 105 adds the address range corresponding to the executable code after the hook in the node containing the hook to the monitoring range for the hook (step B6). In the example where the hook H1 is selected as the hook in question, the node containing the hook is the node 1, and the address range corresponding to the executable code after the hook for the node containing the hook is the lines 2 to 5 of the source code. In this example, the hook H1 is located at the beginning of the node 1, but the hook may be located anywhere in the node. In such cases, the address range corresponding to the executable code after the hook in the node containing the hook is also added to the monitoring range for the hook.

Next, the allowed list creation unit 105 retrieves a subgraph whose first node is the node containing the hook selected in step B5 (step B7). This operation is equivalent to the operation of selecting a subtree from a tree whose root is the node in question (but the CFG is not strictly a tree because it has a closed path). In the example where the hook H1 is selected as the hook in question, the allowed list creation unit 105 retrieves a subgraph whose first node is the node 1. In this example, the subgraph contains all nodes following the node 1.

Next, the allowed list creation unit 105 determines whether or not there are any nodes other than the node containing the hook in the subgraph retrieved in step B7, that is, whether or not the node containing the hook has any child nodes (step B8). If the node containing the hook has child nodes (step B8 is YES), the process proceeds to step B9; if it has no child nodes (step B8 is NO), the process proceeds to step B12. In the example where the hook H1 is selected as the hook in question, the node 1 containing the hook H1 has child nodes (the node 3 and the node 2 containing the hook H2). Therefore, in this example, the process proceeds to step B9.

In step B8, if the node containing the hook has child nodes (step B8 is YES), the allowed list creation unit 105 determines whether any hooks other than the hook exist in the subgraph (step B9). If a hook other than the hook exists in the subgraph (step B9 is YES), the process proceeds to step B11; if no hook other than the hook exists (step B9 is NO), the process proceeds to step B10. In the example where the hook H1 is selected as the hook in question, hooks H2, H4, H5, and H6 exist in addition to the hook H1 in the subgraph. Therefore, in this example, the process proceeds to step B11.

In step B9, if there are no hooks other than the hook in question in the subgraph (step B9 is NO), the allowed list creation unit 105 adds the address range corresponding to the portion of the subgraph from which the node containing the hook is removed to the monitoring range for the hook (step B10). The reason for removing the node containing the hook from the monitoring range for the hook is that the node containing the hook has already been added to the monitoring range in step B6. Thereafter, the process proceeds to step B12. If the hooks H2, H4, H5, and H6 in FIG. 5 did not exist when the hook H1 was selected as the hook in question, the allowed list creation unit 105 adds the address ranges corresponding to the executable codes of the nodes 2, 3, 4, 5, and 6 to the monitoring range for the hook H1.

On the other hand, in step B9, if there is a hook other than the hook in question (step B9 is YES), the allowed list creation unit 105 retrieves a subgraph consisting only of nodes without hooks, with the node containing the hook as the first node in the subgraph. Then, the allowed list creation unit 105 adds the address range (range A) corresponding to the portion of the retrieved subgraph from which the node containing the hook is removed to the monitoring range for the hook. If there is no hook other than the hook in question at the beginning of the node, the range before the hook is added to the range A for the node that has a hook other than the hook in question and is directly connected to the node or range A with the hook (step B11). The reason for removing the node containing the hook from the range A is that the node containing the hook has already been added to the monitoring range in step B6. Thereafter, the process proceeds to step B12. In the example where the hook H1 is selected as the hook in question, the only node containing no hook is the node 3 in the subgraph whose first node is the node 1 containing the hook H1. Therefore, in this example, the node 3 corresponds to the range A. Therefore, the address range corresponding to the executable code of the node 3 is added to the monitoring range for the hook H1. If the node 5 is not the node containing the hook, the range A will be the address range corresponding to the executable code of the node 3 and the node 5. As another example, if the hook H5 of the nod 5 is in the middle of the node 5, the address range of the executable code from the beginning of the node 5 to before the hook H5 is added to the range A.

The processing of the above steps B6 to B11 determine the monitoring range for the hook selected in step B5. In the example where the hook H1 is selected as the hook in question, the monitoring range for H1 is the address range corresponding to the executable code of the node 1 and the node 3.

Next, the allowed list creation unit 105 calculates the hash value of the monitoring range for the hook, which has been determined by the processing of steps B6 to B11 (step B12). In the example where the hook H1 is selected as the hook in question, the monitoring range for the hook H1 is the address range corresponding to the executable code of the node 1 and the node 3, so the allowed list creation unit 105 calculates the hash value of this address range.

Thereafter, the allowed list creation unit 105 registers the set of the hook ID of the hook, the monitoring range for the hook, and hash values of the monitoring range in the allowed list (step B13). After the processing of step B13 is completed, the process returns to step B4, and the allowed list creation unit 105 repeats the processing of steps B5 to B13 until the processing is executed for all hooks on the CFG generated in step A6. In the above description, the hook H1 is selected as an example, but the allowed list creation unit 105 executes the same process for the hooks H2, H4, H5, and H6 in the CFG to determine the monitoring range.

Among the operations of the allowed list creation unit 105 in FIGS. 4A and 4B described above, the operations up to the determination of the monitoring range for each hook on the CFG can be summarized as follows. The allowed list creation unit 105 selects hooks on the CFG sequentially and determines the monitoring range for the selected hooks. At this time, the allowed list creation unit 105 traces the node containing no hook among all the descendant nodes of the node containing the selected hook. Then, the allowed list creation unit 105 determines the range from the node containing the selected hook to the node immediately before the node containing the next hook as the monitoring range for the selected hook.

Effect of First Example Embodiment

Next, the effects of the tamper detection feature embedding device 100 according to the first example embodiment will be described.

According to the first example embodiment, in creating the allowed list, the allowed list creation unit 105 determines the monitoring range for the tamper detection feature calling functions based on the CFG. Therefore, the monitoring range for the tamper detection feature calling functions can be appropriately determined. As a result, the number of nodes on the CFG that cannot be monitored can be reduced in the software to be monitored.

More specifically, according to the first example embodiment, the allowed list creation unit 105 selects the tamper detection feature calling functions on the CFG sequentially, and traces the nodes containing no tamper detection feature calling functions among all the descendant nodes of the node containing the selected tamper detection feature calling functions. Then, the allowed list creation unit 105 determines the monitoring range for the selected tamper detection feature calling functions from the node containing the selected tamper detection feature calling function to the node immediately before the node containing the next tamper detection feature calling function. Therefore, the monitoring range for the selected tamper detection feature calling functions can include not only one node that contains the selected tamper detection feature calling functions, but also descendant nodes containing no tamper detection feature calling functions. As a result, the number of nodes on the CFG that cannot be monitored can be reduced in the software to be monitored.

In addition, according to the first example embodiment, the tamper detection feature calling functions execute monitoring on a node-by-node basis on the CFG, thus avoiding the increase in the monitoring range at one time. As a result, the time of monitoring at one time can be reduced, which is expected to reduce the possibility of the monitoring time affecting the operation of the device in which the tamper detection feature is embedded.

Furthermore, according to the first example embodiment, the allowed list creation unit 105 can determine the monitoring range for the tamper detection feature calling functions simply by tracing the nodes on the CFG, thus allowing execution of mechanical processing.

Second Example Embodiment

The tamper detection feature embedding device 100 according to the first example embodiment described above is configured to output an allowed list in file format.

On the other hand, a tamper detection feature embedding device 200 according to the second example embodiment is configured to embed an allowed list in a software and output it.

Configuration of Second Example Embodiment

First, an example of the configuration of the tamper detection feature embedding device 200 according to the second example embodiment is described with reference to FIG. 6.

Figure 6:
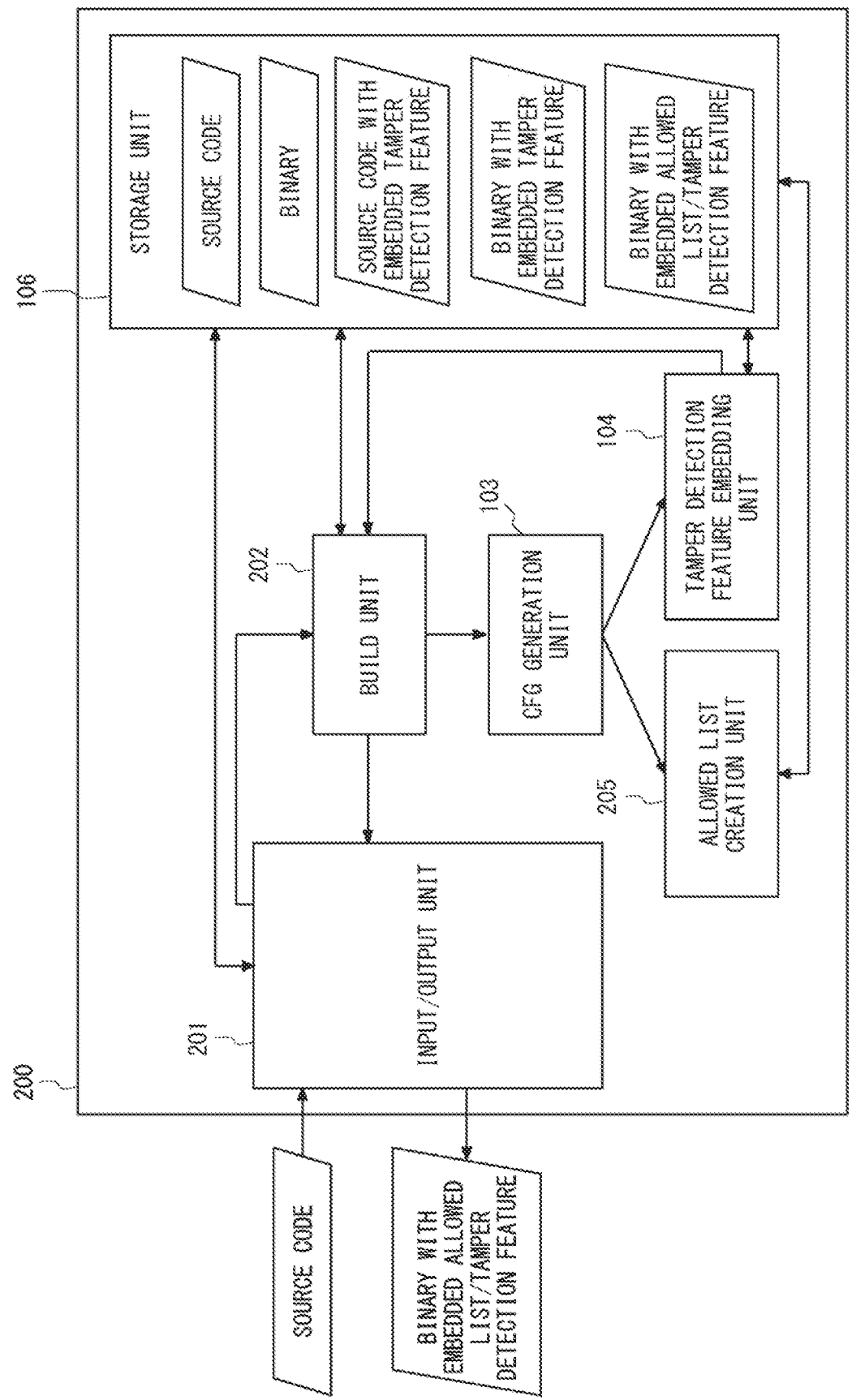
FIG. 6 is a block diagram illustrating an example of the configuration of a tamper detection feature embedding device according to the second example embodiment.

Referring to FIG. 6, in the tamper detection feature embedding device 200 according to the second example embodiment, the input/output unit 101, the build unit 102, and the allowed list creation unit 105 of the tamper detection feature embedding device 100 according to the first example embodiment described above are replaced by an input/output unit 201, a build unit 202, and an allowed list creation unit 205, respectively. The configuration of the other parts of the tamper detection feature embedding device 200 is the same as that of the tamper detection feature embedding device 100, so detailed description thereof will be omitted.

When the input/output unit 101 according to the first example embodiment described above receives a notification from the allowed list creation unit 105, it reads a binary with embedded tamper detection feature and an allowed list from the storage unit 106 and outputs them.

On the other hand, when the input/output unit 201 according to the second example embodiment receives the notification described later from the build unit 202, it reads from the storage unit 106 a binary with embedded tamper detection feature in which an allowed list is further embedded (hereinafter referred to as a binary with embedded allowed list/tamper detection feature), which is described later, and outputs it. Other operations of the input/output unit 201 are similar to those of the input/output unit 101, and thus detailed description thereof will be omitted.

The build unit 202 according to the second example embodiment executes the following operations in addition to the operations of the build unit 102 according to the first example embodiment described above. When the build unit 202 receives the notification described later from the allowed list creation unit 205, it reads the source code with embedded tamper detection feature from the storage unit 106 and builds it. As described later, an allowed list in source code format is embedded in the source code with embedded tamper detection feature at this time. Therefore, the binary generated by the build by the build unit 202 here becomes the binary with embedded allowed list/tamper detection feature. The build unit 202 stores the generated binary with embedded allowed list/tamper detection feature in the storage unit 106 and sends a notification to the input/output unit 201 to execute processing.

The allowed list creation unit 105 according to the first example embodiment described above creates an allowed list in file format, stores the created allowed list in the storage unit 106, and send a notification to the input/output unit 101 to execute processing.

On the other hand, the allowed list creation unit 205 according to the second example embodiment creates an allowed list in source code format. The allowed list creation unit 205 stores the created allowed list in the storage unit 106 as a part of the tamper detection embedded source code and sends a notification to the build unit 202 to execute processing.

Operation of Second Example Embodiment

Figure 7:
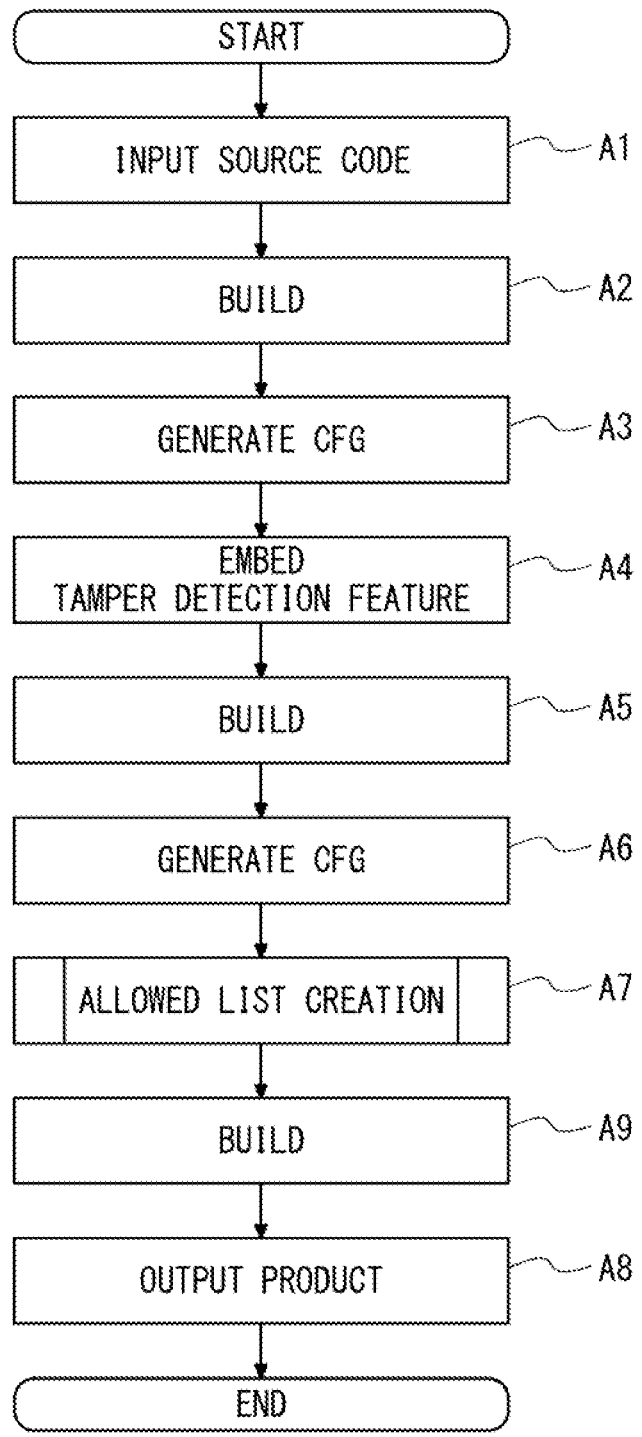
FIG. 7 is a flowchart illustrating an example of the overall operation of the tamper detection feature embedding device according to the second example embodiment.

Next, with reference to the flowchart in FIG. 7, an example of the overall operation of the tamper detection feature embedding device 200 according to the second example embodiment is described in detail.

The operation of the tamper detection feature embedding device 200 according to the second example embodiment is the same as the operation of the tamper detection feature embedding device 200 according to the above-described first example embodiment in FIG. 3, except for the following operation.

In step A7, the allowed list creation unit 205 creates an allowed list in source code format. The allowed list creation unit 205 stores the allowed list in source code format in the storage unit 106 as a part of the source code with embedded tamper detection feature and sends a notification to the build unit 202 to execute processing.

In step A9 executed after step A7, when the build unit 202 receives the notification from the allowed list creation unit 205, it reads the source code with embedded tamper detection feature from the storage unit 106 and builds it. In step A7, an allowed list in source code format is embedded in the source code with embedded tamper detection feature at this time. Therefore, the binary generated by the build by the build unit 202 here becomes the binary with embedded allowed list/tamper detection feature. The build unit 202 stores the generated binary with embedded allowed list/tamper detection feature in the storage unit 106 and sends a notification to the input/output unit 201 to execute processing.

In step A8 executed after step A9, when the input/output unit 201 receives the notification from the build unit 202, it reads the binary with embedded allowed list/tamper detection from the storage unit 106, and outputs the read binary with embedded allowed list/tamper detection feature.

Effects of Second Example Embodiment

Next, the effects of the tamper detection feature embedding device 200 according to the second example embodiment will be described.

According to the second example embodiment, the build unit 202 builds the source code with embedded tamper detection feature in which the allowed list in source code format is embedded. The input/output unit 201 outputs the binary with embedded allowed list/tamper detection feature generated by the build. As described above, since the allowed list is embedded in the software, the present disclosure can be applied to software that is embedded in a device that does not allow file input/output.

Other effects of the second example embodiment are the same as those of the first example embodiment described above.

Third Example Embodiment

A tamper detection feature embedding device 300 according to the third example embodiment is configured using Trusted Execution Environment (TEE). The TEE is a feature of restricting access to a partial region of the memory from the outside by hardware. Here, a memory area in which access from the outside is restricted is referred to as Secure World (SW), and other memory areas are referred to as Normal World (NW).

In the tamper detection feature embedding device 300 of the third example embodiment, tempering of running devices can be more safely by embedding the tamper detection feature as the source code on the SW side.

Configuration of Third Example Embodiment

First, an example of the configuration of the tamper detection feature embedding device 300 according to the third example embodiment is described with reference to FIG. 8.

Figure 8:
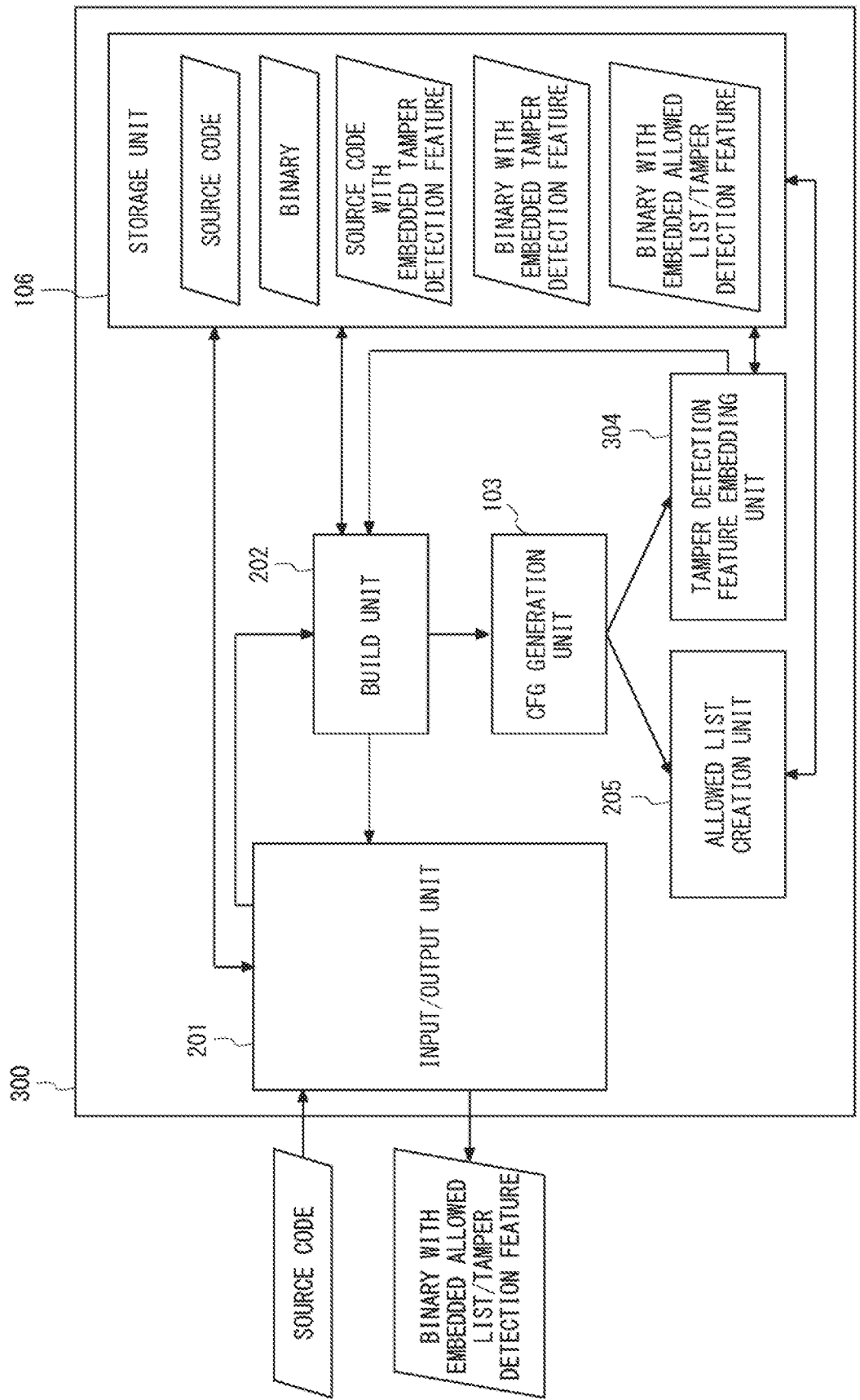
FIG. 8 is a block diagram illustrating an example of the configuration of a tamper detection feature embedding device according to a third example embodiment.

Referring to FIG. 8, in the tamper detection feature embedding device 300 according to the third example embodiment, the tamper detection feature embedding unit 104 in the tamper detection feature embedding device 200 according to the second example embodiment described above is replaced by a tamper detection feature embedding unit 304. The configuration of the other parts of the tamper detection feature embedding device 300 is the same as that of the tamper detection feature embedding device 200, detailed description thereof will be omitted.

The tamper detection feature embedding unit 304 according to the third example embodiment embeds the tamper detection feature on the SW side as a source code. Since the other operations of the tamper detection feature embedding unit 304 are the same as those of the tamper detection feature embedding unit 104, detailed description thereof will be omitted.

Operation of Third Example Embodiment

Next, an example of the overall operation of the tamper detection feature embedding device 300 according to the third example embodiment is described in detail.

The operation of the tamper detection feature embedding device 300 according to the third example embodiment is the same as the operation of the tamper detection feature embedding device 200 according to the above-described second example embodiment in FIG. 7, except for the following operation.

As described above, the build unit 202 executes the build in steps A2, A5, and A9 in FIG. 7. At that time, the build unit 202 first executes a build related to the SW side, and then executes a build related to the NW side. In step A2 and step A5, the build unit 202 may build in one of the following two patterns, depending on the design of the software to be monitored.

The first pattern is when the software to be monitored consists only of NWs. In this case, the tamper detection feature embedding unit 304 embeds only the tamper detection feature in the SW side as source code, and the build unit 202 executes the build related to the SW side. Thereafter, the build unit 202 builds all the remaining source codes as NW-side software.

The second pattern is when the software to be monitored originally uses SW. In this case, the tamper detection feature embedding unit 304 newly embeds the tamper detection feature as source code on the SW side, and the build unit 202 executes the build related to the SW side together with the source code originally embedded in the SW side. Thereafter, the build unit 202 builds all the remaining source codes as NW-side software. The build method using TEE can be realized using an existing tool, and thus detailed description thereof will be omitted.

Effects of Third Example Embodiment

Next, the effects of the tamper detection feature embedding device 300 according to the third example embodiment will be described.

According to the third example embodiment, the tamper detection feature embedding unit 304 embeds the tamper detection feature in SW, which is a memory area whose safety is guaranteed by hardware. As a result, attacks against the tamper detection feature can be prevented, and thus more secure operation of the device can be implemented than in the first and second example embodiments described above.

Other effects of the third example embodiment are the same as those of the second example embodiment described above.

The third example embodiment is described as a modification of the second example embodiment described above, but the present invention is not limited thereto. The third example embodiment may be an example of the modification of the first example embodiment described above.

Fourth Example Embodiment

Next, an example of the configuration of a tamper detection feature embedding device 400 according to the fourth example embodiment is described with reference to FIG. 9.

Figure 9:
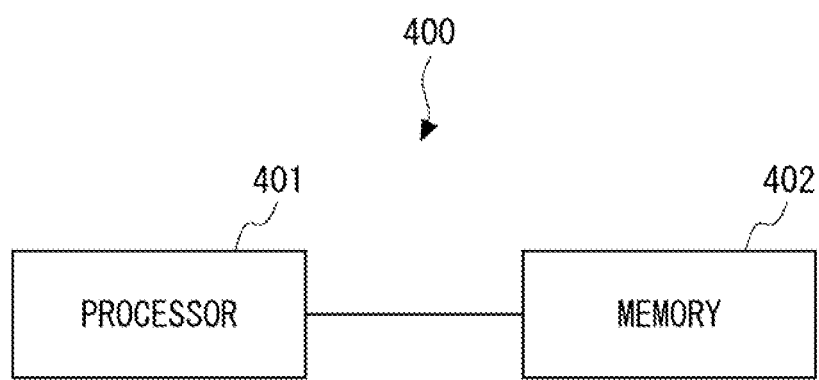
FIG. 9 is a block diagram illustrating an example of a hardware configuration of a tamper detection feature embedding device according to a fourth example embodiment.

Referring to FIG. 9, the tamper detection feature embedding device 400 includes a processor 401 and a memory 402.

The processor 401 may be, for example, a micro processing unit (MPU) or a CPU. The processor 401 may include a plurality of processors. The memory 402 is composed of a combination of a volatile memory and a nonvolatile memory. The memory 402 may include a storage disposed away from the processor 401. In this case, the processor 401 may access the memory 402 via an I/O interface (not illustrated).

Each of the tamper detection feature embedding devices 100, 200, and 300 according to the first, second, and third example embodiments described above may have the hardware configuration illustrated in FIG. 9. In the tamper detection feature embedding devices 100, 200, and 300 according to the first, second, and third example embodiments described above, the input/output units 101 and 201, the build units 102 and 202, the CFG generation unit 103, the tamper detection feature embedding units 104 and 304, and the allowed list creation units 105 and 205 may be realized by the processor 401 reading and executing a program stored in the memory 402. In addition, the storage unit 106 of the tamper detection feature embedding devices 100, 200, and 300 according to the first, second, and third example embodiments described above may be realized by the memory 402.

The program can be stored using various types of non-transitory computer readable media and supplied to the tamper detection feature embedding devices 100, 200, and 300. Examples of the non-transitory computer readable media include magnetic recording media (for example, flexible disks, magnetic tapes, or hard disk drives), magneto-optical recording media (for example, magneto-optical disks). Other examples of the non-transitory computer readable medium include a read only memory (CD-ROM), a CD-R, and a CD-R/W. Yet other examples of the non-transitory computer readable media include semiconductor memory. Examples of the semiconductor memory include a mask ROM, a programmable ROM (PROM), an erasable PROM (EPROM), a flash ROM, and a random access memory (RAM). In addition, the program may be supplied to the tamper detection feature embedding devices 100, 200, and 300 by various types of transitory computer readable media. Examples of the transitory computer readable media include electrical signals, optical signals, and electromagnetic waves. The transitory computer readable media can provide the program to the tamper detection feature embedding devices 100 and 200 via wired communication paths such as electric wires and optical fibers, or wireless communication paths.

The present disclosure has been described above with reference to the example embodiments, but the present disclosure is not limited to the example embodiments described above. Various modifications that could be understood by those skilled in the art can be made to the configuration and details of the present disclosure within the scope of the present disclosure.

REFERENCE SIGNS LIST

100 TAMPER DETECTION FEATURE EMBEDDING DEVICE
101 INPUT/OUTPUT UNIT
102 BUILD UNIT
103 CFG GENERATION UNIT
104 TAMPER DETECTION FEATURE EMBEDDING UNIT
105 ALLOWED LIST CREATION UNIT
106 STORAGE UNIT
200 TAMPER DETECTION FEATURE EMBEDDING DEVICE
201 INPUT/OUTPUT UNIT
202 BUILD UNIT
205 ALLOWED LIST CREATION UNIT
300 TAMPER DETECTION FEATURE EMBEDDING DEVICE
304 TAMPER DETECTION FEATURE EMBEDDING UNIT
400 TAMPER DETECTION FEATURE EMBEDDING DEVICE
401 PROCESSOR
402 MEMORY

What is claimed is:

1. A tamper detection feature embedding device configured to embed an allowed list type tamper detection feature using hash values in a software to be monitored, the tamper detection feature embedding device comprising:
   at least one memory storing instructions, and
   at least one processor configured to execute the instructions to:
   receive input of a first source code, which is the source code of the software;
   build the first source code to generate a first binary;
   generate a first control flow graph (CFG) based on the first binary;
   determine embedding points to embed tamper detection feature calling functions in the first source code based on the first CFG, embed the tamper detection feature calling functions in the determined embedding points in the first source code, and embed the tamper detection feature in the first source code;
   build a second source code, which is the source code in which the tamper detection feature and the tamper detection feature calling functions are embedded in the first source code, to generate a second binary;
   generate a second CFG based on the second binary;
   create an allowed list based on the second binary and the second CFG, and
   output the second binary and the allowed list,
   wherein the at least one processor is further configured to execute the instructions to determine a monitoring range for the tamper detection feature calling functions based on the second CFG, and create a list of hash values of the monitoring range for the tamper detection feature calling functions as the allowed list.

2. The tamper detection feature embedding device according to claim 1, wherein
   the at least one processor is further configured to execute the instructions to
   sequentially select the tamper detection feature calling functions on the second CFG, and
   trace nodes that do not contain the tamper detection feature calling functions among all descendant nodes of a node containing the selected tamper detection feature calling functions, and determine the range from the node containing the selected tamper detection feature calling functions to a node immediately before the next node containing the tamper detection feature calling functions as the monitoring range for the selected tamper detection feature calling functions.

3. The tamper detection feature embedding device according to claim 1, wherein
   the at least one processor is further configured to execute the instructions to
   create the allowed list in file format, and
   output the allowed list in file format.

4. The tamper detection feature embedding device according to claim 1, wherein
   the at least one processor is further configured to execute the instructions to
   create the allowed list in source code format and embeds the created allowed list in source code format in the second source code, build the second source code in which the allowed list is embedded to generate the second binary in which the allowed list is embedded, and output the second binary in which the allowed list is embedded.

5. The tamper detection feature embedding device according to claim 1, wherein, when a device on which the software operates has a specific memory area to which external access is restricted by hardware, the at least one processor is further configured to execute the instructions to embed the tamper detection feature in the source code disposed on the specific memory area.

6. A tamper detection feature embedding method executed by a tamper detection feature embedding device configured to embed an allowed list type tamper detection feature using hash values in a software to be monitored, the tamper detection feature embedding method comprising:

an input step of inputting a first source code, which is the source code of the software;

a first build step of building the first source code to generate a first binary;

a first CFG generation step of generating a first control flow graph (CFG) based on the first binary;

a tamper detection feature embedding step of determining embedding points to embed tamper detection feature calling functions in the first source code based on the first CFG, embedding the tamper detection feature calling functions in the determined embedding points in the first source code, and embedding the tamper detection feature in the first source code;

a second build step of building a second source code, which is the source code in which the tamper detection feature and the tamper detection feature calling functions are embedded in the first source code, to generate a second binary;

a second CFG generation step of generating a second CFG based on the second binary;

an allowed list creation step of creating an allowed list based on the second binary and the second CFG, and an output step of outputting the second binary and the allowed list, wherein the allowed list creation step determines a monitoring range for the tamper detection feature calling functions based on the second CFG, and creates a list of hash values of the monitoring range for the tamper detection feature calling functions as the allowed list.

7. A non-transitory computer readable medium storing a program that causes a computer to execute processing of embedding an allowed list type tamper detection feature using hash values in a software to be monitored, the program comprising:

an input step of inputting a first source code, which is the source code of the software;

a first build step of building the first source code to generate a first binary;

a first CFG generation step of generating a first control flow graph (CFG) based on the first binary;

a tamper detection feature embedding step of determining embedding points to embed tamper detection feature calling functions in the first source code based on the first CFG, embedding the tamper detection feature calling functions in the determined embedding points in the first source code, and embedding the tamper detection feature in the first source code;

a second build step of building a second source code, which is the source code in which the tamper detection feature and the tamper detection feature calling functions are embedded in the first source code, to generate a second binary;

a second CFG generation step of generating a second CFG based on the second binary;

an allowed list creation step of creating an allowed list based on the second binary and the second CFG, and an output step of outputting the second binary and the allowed list, wherein the allowed list creation step determines the monitoring range for the tamper detection feature calling functions based on the second CFG, and creates a list of hash values of the monitoring range for the tamper detection feature calling functions as the allowed list.

* * * * *